US009162643B2

(12) United States Patent
Pech et al.

(10) Patent No.: US 9,162,643 B2
(45) Date of Patent: Oct. 20, 2015

(54) DEVICE AND METHOD FOR THE DETECTION OF PERSONS

(75) Inventors: Andreas Pech, Glashutten (DE); Peter Nauth, Alsbach (DE)

(73) Assignee: Frankfurt University of Applied Sciences, Frankfurt (DE)

(*) Notice: Subject to any disclaimer, the term of this patent is extended or adjusted under 35 U.S.C. 154(b) by 88 days.

(21) Appl. No.: 13/817,886

(22) PCT Filed: Aug. 24, 2011

(86) PCT No.: PCT/EP2011/064508
§ 371 (c)(1),
(2), (4) Date: Apr. 3, 2013

(87) PCT Pub. No.: WO2012/025552
PCT Pub. Date: Mar. 1, 2012

(65) Prior Publication Data
US 2013/0215720 A1    Aug. 22, 2013

(30) Foreign Application Priority Data
Aug. 25, 2010   (EP) ...................................... 10174010
Aug. 27, 2010   (EP) ...................................... 10174255

(51) Int. Cl.
*B60Q 1/00*      (2006.01)
*B60R 21/0134*   (2006.01)
*G01S 13/93*     (2006.01)

(52) U.S. Cl.
CPC ........... *B60R 21/0134* (2013.01); *G01S 13/931* (2013.01)

(58) Field of Classification Search
CPC .......... G01S 13/931; G01S 2013/9375; B60R 21/0134
USPC .............. 340/435, 436, 432, 925; 367/93, 94; 342/70, 118
See application file for complete search history.

(56) References Cited

U.S. PATENT DOCUMENTS

| | | | |
|---|---|---|---|
| 7,543,677 B2 * | 6/2009 | Igawa .............................. | 701/45 |
| 2005/0099278 A1 * | 5/2005 | Kawaura et al. .............. | 340/435 |
| 2005/0131646 A1 | 6/2005 | Camus | |
| 2005/0278098 A1 * | 12/2005 | Breed ............................. | 701/45 |
| 2010/0026555 A1 * | 2/2010 | Whittaker et al. .............. | 342/70 |
| 2010/0063676 A1 * | 3/2010 | Ito .................................. | 701/36 |

FOREIGN PATENT DOCUMENTS

| | | |
|---|---|---|
| DE | 60 2006 001012 | 6/2009 |
| DE | 10 2009 038929 | 8/2009 |
| WO | 2005/096011 | 10/2005 |

* cited by examiner

*Primary Examiner* — Thomas Mullen
(74) *Attorney, Agent, or Firm* — Clark & Brody

(57) ABSTRACT

The invention relates to systems for the detection and identification (and/or differentiation) of objects for use in vehicles (stationary usage is also conceivable, e.g. to combat crime, building protection), wherein objects are detected and identified via ultrasound signals. In particular, the differentiation of pedestrians and cyclists from cars and fixed obstacles such as walls is of key focus. Ultrasound sensors are hereby used. By processing the signals and comparing them with reference signals, a differentiation between living and non-living objects is possible.

3 Claims, 2 Drawing Sheets

DEVICE AND METHOD FOR THE DETECTION OF PERSONS

FIELD OF THE INVENTION

The present invention relates to a device and method with which persons are suitable to be detected via ultrasound. This is used to reduce personal injury in vehicles. As soon as a person or cyclist is detected, it is possible to take special prior measures, so that personal injury is kept to a minimum.

BACKGROUND ART

There are already several developments in existence which serve to detect personal injuries. The majority of developments involve deriving corresponding measures from the impact design. This has the disadvantage of causing injury to the person. Furthermore, corresponding measures have to be implemented very quickly (in the microsecond range), which is also likely to lead to additional injury to the person.

DE602006001012T2 describes a system wherein a person is suitable to be detected via the analysis of two visual images (stereo camera). The analysis of two visual images has the disadvantage that the image becomes unrecognizable via droplets in case of rain. Furthermore, the visual detection of persons at night is extremely difficult.

A differentiation between moving persons and moving objects is also a problem. This is why a system is described in DE 10 2009 038 929 that calculates the speeds or sizes of objects via radar and camera by means of the temporal recording of distances to objects. However, this also has the disadvantage that a precise differentiation between person and object is not readily possible. Objects are suitable to overlap, thereby resulting in unusual sizes or movements. Furthermore, objects may take the dimensions of people, so that a differentiation is not suitable to be made.

SUMMARY OF THE INVENTION

The aim of the present invention is to overcome the disadvantages of the state of the art.

This aim is achieved according to the present invention via a device wherein at least one sender emits mechanical or electromagnetic waves which are reflected off the living or non-living object. These waves are received by at least one sensor and analyzed in an analysis unit. The development thereby utilizes the fact that information about the surface structure of the reflection body is modulated on the reflected waves. The analysis unit comprises a pattern analysis of the reflected waves. The pattern analysis comprises a comparison with saved data (reference data). A transform of the signals of the reflected waves (e.g. fast Fourier transform, wavelet transform, digital sine or cosine transform or another transform) is preferably carried out.

Furthermore, an analysis is preferably carried out into how similar the signal pattern of the reflected wave is with the saved signal patterns. This is, by way of example, suitable to be achieved using fuzzy logic or via threshold values or a statistical classifier.

This has the advantage that the comparison is suitable to occur due to the form of the signal pattern rather than by its absolute position.

As a result, signal shifts (double effect), which arise due to the movement of an object, are not relevant for detection.

Furthermore, a person is also suitable to be detected in case of overlapping objects. Ultrasound (16 kHz to 1.6 GHz, preferably 40 and 100 kHz) or radio waves (1 kHz to 100 THz) are particularly preferred as waves.

The saved reference data is present in a form which makes it suitable for it to be directly compared with the signals of the reflected waves or with the transformed signals of the reflected waves.

The reference data was determined via experiments or via simulations and is present as saved data.

The analysis unit also provides the distance to the object and the recognized size of the object. By way of example, both values are also considered for a quicker comparison of signal data with the reference data.

The pattern detection unit comprises a module for the analysis of signals and the comparison with reference data.

The pattern detection unit also comprises a module for the implementation of transforms.

The development according to the present invention is suitable to be implemented as a device comprising sender, receiver and analysis unit with pattern detection unit. Alternatively, the sender and receiver and the analysis unit with pattern detection are also suitable to form a device. For the latter configuration, several sender and receiver devices are suitable to be connected to the analysis unit with pattern detection.

The method according to the present invention comprises the following steps.
1. Sending of mechanical or electromagnetic waves,
2. Receipt of reflected waves,
3. Signal processing,
4. Signal analysis and
5. Comparison with reference data.

The accuracy of detection is suitable to be increased by first recording the external ambient conditions. The ambient temperature and speed of the vehicle are hereby recorded.

Due to the ambient conditions, an advantageous send frequency, bandwidth, pulse sequence and repeat cycles for the pulse sequence are suitable to be selected.

A corresponding signal is sent as a result.

The signal reflecting from one or more objects is received. During signal processing, the analog reflection signals are converted into digital reflection signals in a corresponding analog-to-digital converter (ADC).

In one embodiment, disruptive frequencies are filtered out of the reflection signal via a frequency filter during signal processing. The filter is suitable to be used with an analog or digital reflection signal.

In a further step, the signal analysis is carried out as part of the pattern detection. The digital reflection signal is, by way of example, thereby transformed via a transformation into frequencies. The transform thereby comprises a fast Fourier transform, wavelet transform, digital sine or cosine transform or another transform suitable for this purpose. Other parameters are suitable to be determined for pattern detection from the digital reflection signal. As such, by way of non-exhaustive example, the distortion factor, center frequency, bandwidth, kurtosis, namely the standardized fourth moment of the values of the Fourier transforms determined as random variables to the fourth power of their standard deviation, the rise time from the start of the scattered signal to the maximum amplitude, parameters obtained from correlation analyses, parameters obtained via convolution with specified functions (transforms, e.g. wavelet transform, cosine transform) are suitable to be determined individually or in combination.

Furthermore, the distance to the reflecting object and the size of the reflecting object are suitable to be determined.

A pattern comparison is then possible with the parameters determined from the signal analysis.

The parameters determined are hereby compared with the saved data. The saved data was calculated via experiments or calculations. If the ambient conditions are recorded, data is selected as a reference which comprises a smaller deviation from the ambient conditions.

An unambiguous correlation is possible in the rarest of cases. The parameters are therefore checked to see how similar they are to the reference data.

This is possible individually or in combination via fuzzy logic, artificial neural networks, statistical classifiers (e.g. polynomial classifiers), individual threshold values or statistical values such as standard deviation. These are referred to as a discrimination function.

A probability of accordance between the parameters and the corresponding reference patterns is preferably indicated.

In doing so, the pattern detection is concluded. The data determined is suitable to activate a direct signal or forward the determined data to other devices. It is thereby possible, in the event of the detection of a living object (person or animal), to take measures which reduce injury. However, application is not limited purely to damage reduction. Persons or objects are also suitable to be detected in visually limited conditions, e.g. in rain or at night, thereby making the person or object visible to the driver (e.g. overlay in the display or windshield, acoustic signal or vibration signal). FIG. 1 shows a vehicle 1 equipped with a front and rear devices 101 and 102 for the differentiation of objects, i.e., a pedestrian 104 and a non-living object 106.

DETAILED DESCRIPTION OF THE INVENTION

Figure 1:
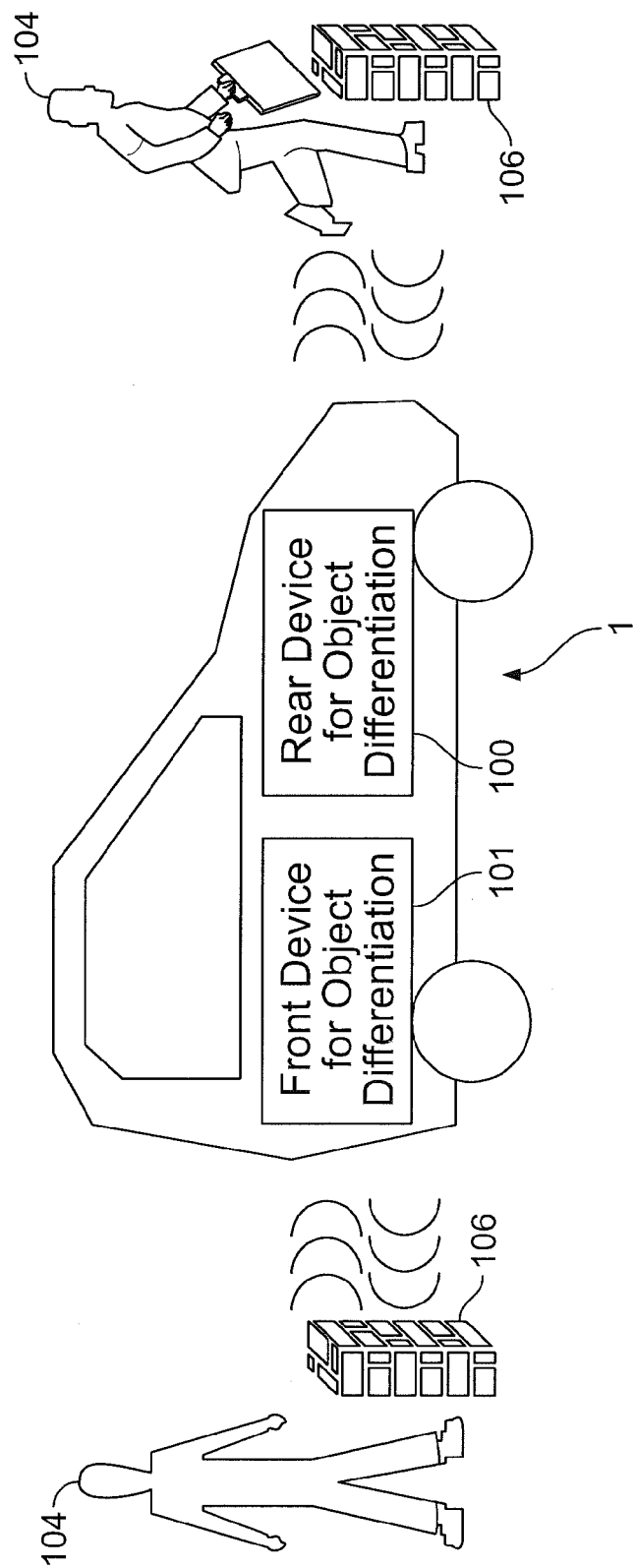
FIG. 1 is an illustration of one application of the inventive, wherein the device is suitable to be installed at the front, rear, and at sides of a vehicle.
Figure 2:
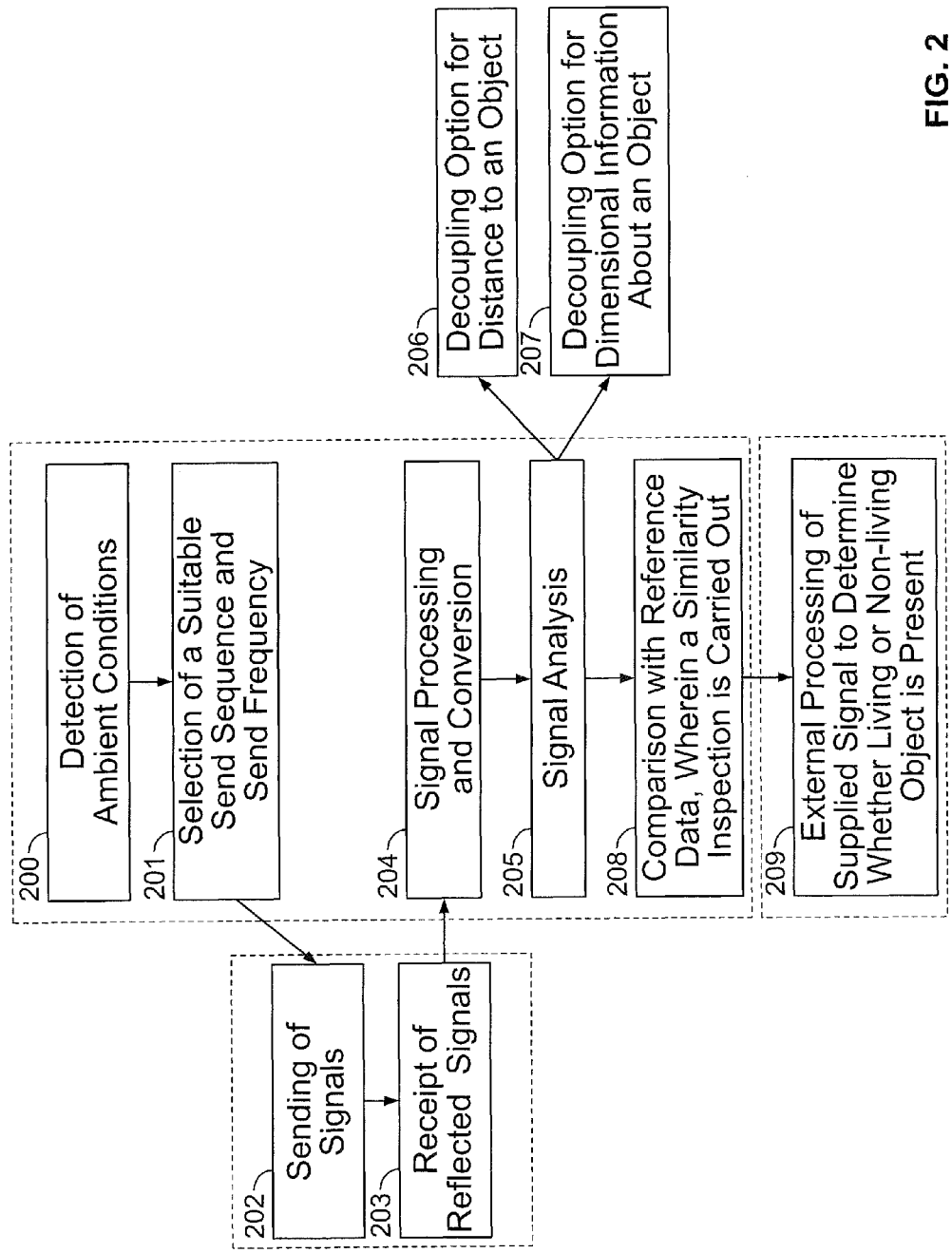
FIG. 2 is a flow chart showing how the components of the inventive device relate to each other.

After detection of the ambient conditions 200, a send frequency of 41 kHz, bandwidth of 2 kHz an alternating pulse sequence is selected 201. An ultrasound signal is subsequently sent 202 and encounters a pedestrian. The reflection signal is received 203, and transformed in signal processing 204 via analog filter and ADC into a digital reflection signal. Signal analysis 205 is subsequently carried out. The parameters center frequency M, distortion factor K, kurtosis O and rise time A are hereby detected and were determined as M=40.5 kHz; K=8.2 10-3, O=12.5, A=2.4 µs.

These parameters are compared with previously saved data 208. According to the similarity analysis, the probability for a pedestrian is defined as 0.8 while for a vehicle this is 0.1.

In this case, a signal is generated for a living object. This signal is sent to the corresponding devices, so that relevant measures are suitable to be made to reduce injury to persons.

For the signal analysis 205, the distance 206 and the width 207 of the object (in this case a pedestrian) are also determined.

100 Front device for the differentiation of objects
101 Rear device for the differentiation of objects
200 Detection of ambient conditions
201 Selection of a suitable send sequence and send frequency
202 Sending of signals
203 Receipt of reflected signals
204 Signal processing and conversion
205 Signal analysis
206 Decoupling option for the distance to the object
207 Decoupling option for dimensional information about an object
208 Comparison with reference data, wherein a similarity inspection is carried out
209 External processing of the supplied signal as to whether a living or non-living object is present

The invention claimed is:

1. A method for the detection of pedestrians, comprising:
   a) transmitting mechanical waves with the mechanical waves being reflected by an object;
   b) receiving waves reflected from the object with modulated information as to a surface structure of the object in the form of analog reflection signals;
   c) processing the signals received by converting the analog reflection signals into digital reflection signals;
   d) analyzing the digital reflection signals in respect of the modulated information as to the surface structure of the object and developing a signal pattern based on the analyzing of the digital reflection signals;
   e) comparing the signal pattern with stored reference patterns of objects including pedestrians;
   f) detecting similarities between the signal pattern and the stored reference patterns; and
   g) emitting a signal to indicate whether an object has been detected and the object is a pedestrian based on detected similarities.

2. The method according to claim 1, wherein the analyzing step comprises a transform.

3. The method according to claim 2, wherein the analyzing step comprises a transform from the group of fast Fourier transform, wavelet transform, or digital sine or cosine transform.

* * * * *